US012319530B2

(12) United States Patent
Kobayashi

(10) Patent No.: US 12,319,530 B2
(45) Date of Patent: Jun. 3, 2025

(54) POST PROCESSING APPARATUS, SHEET PROCESSING SYSTEM, AND OPERATION CONTROL METHOD CAPABLE OF SUPPRESSING OCCURRENCE OF DEFECTS

(71) Applicant: KYOCERA Document Solutions Inc., Osaka (JP)

(72) Inventor: Yasuyoshi Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/426,072

(22) Filed: Jan. 29, 2024

(65) Prior Publication Data

US 2024/0300773 A1 Sep. 12, 2024

(30) Foreign Application Priority Data

Mar. 6, 2023 (JP) ................................ 2023-033515

(51) Int. Cl.
*B65H 37/04* (2006.01)
*B65H 39/10* (2006.01)
*F26B 3/04* (2006.01)

(52) U.S. Cl.
CPC ............... *B65H 39/10* (2013.01); *F26B 3/04* (2013.01); *B65H 2301/51611* (2013.01); *B65H 2801/24* (2013.01)

(58) Field of Classification Search
CPC ........ B65H 37/04; B65H 31/02; B65H 39/10; B65H 2301/5161; B65H 2301/51611; B65H 2301/5144; B65H 2301/5305; B65H 2601/21; B65H 2515/40; B65H 2553/27; B65H 2801/24
USPC ........................................... 270/58.07, 58.08
See application file for complete search history.

(56) References Cited

U.S. PATENT DOCUMENTS

| | | | | |
|---|---|---|---|---|
| 7,510,177 B2 * | 3/2009 | Nagata | B65H 29/14 | 270/58.08 |
| 7,832,717 B2 * | 11/2010 | Sasahara | G03G 21/206 | 399/407 |
| 8,083,219 B2 * | 12/2011 | Sasahara | G03G 21/206 | 399/407 |
| 2012/0161379 A1 * | 6/2012 | Matsui | B65H 31/36 | 270/58.17 |

(Continued)

FOREIGN PATENT DOCUMENTS

JP 2012013297 A 1/2012

*Primary Examiner* — Leslie A Nicholson, III
(74) *Attorney, Agent, or Firm* — Alleman Hall & Tuttle LLP

(57) ABSTRACT

A post processing apparatus includes a first sheet stacking portion, a stapling portion, a driving portion, and an airflow generating portion. The first sheet stacking portion stacks the sheets conveyed from an image forming apparatus that forms images on the sheets. The stapling portion is provided below a sheet conveying path leading to the first sheet stacking portion so as to be able to move along a width direction of the sheet orthogonal to a conveying direction of the sheet, and is configured to bundle sheets stacked on the first sheet stacking portion. The driving portion generates a driving force that moves the stapling portion according to the power supply. The airflow generating portion generates an airflow that flows into a movement space of the stapling portion via the driving portion.

7 Claims, 5 Drawing Sheets

(56) References Cited

U.S. PATENT DOCUMENTS

2015/0309463 A1 * 10/2015 Masunari .............. B65H 33/08
412/16

* cited by examiner

POST PROCESSING APPARATUS, SHEET PROCESSING SYSTEM, AND OPERATION CONTROL METHOD CAPABLE OF SUPPRESSING OCCURRENCE OF DEFECTS

INCORPORATION BY REFERENCE

This application is based upon and claims the benefit of priority from the corresponding Japanese Patent Application No. 2023-033515 filed on Mar. 6, 2023, the entire contents of which are incorporated herein by reference.

BACKGROUND

The present disclosure relates to a post processing apparatus, a sheet processing system, and an operation control method.

In an inkjet image forming apparatus, defects such as curls being formed on a sheet may occur due to moisture included in the sheet after image formation. On the other hand, an image forming apparatus is known that heats a sheet after image formation.

SUMMARY

A post processing apparatus according to one aspect of the present disclosure includes a first sheet stacking portion, a stapling portion, a driving portion, and an airflow generating portion. The first sheet stacking portion stacks the sheets conveyed from an image forming apparatus that forms images on the sheets. The stapling portion is provided below a sheet conveying path leading to the first sheet stacking portion so as to be able to move along a width direction of the sheet orthogonal to a conveying direction of the sheet, and is configured to bundle sheets stacked on the first sheet stacking portion. The driving portion generates a driving force that moves the stapling portion according to the power supply. The airflow generating portion generates an airflow that flows into a movement space of the stapling portion via the driving portion.

A sheet processing system according to another aspect of the present disclosure includes the post processing apparatus and a drive control portion. The drive control portion, in a case where a temperature of the movement space is lower than a predetermined first temperature outside the execution period of the output process for outputting the sheet after image formation using the image forming apparatus and the post processing apparatus, causes the stapling portion to move back-and-forth and causes the airflow generating portion to generate the airflow until the temperature of the movement space exceeds a second temperature that is higher than the first temperature.

An operation control method according to another aspect of the present disclosure is executed by a sheet processing system including a post processing apparatus, the post processing apparatus including: a first sheet stacking portion on which a sheet conveyed from an image forming apparatus that forms an image on the sheet is stacked; a stapling portion provided below a sheet conveying path leading to a first sheet stacking portion so as to be able to move along a width direction of the sheet orthogonal to a sheet conveying direction, and configured to bundle sheets stacked on a first sheet stacking portion; a driving portion configured to generate a driving force to move the stapling portion according to a power supply; and an airflow generating portion configured to generate an airflow that flows into a movement space of the stapling portion via the driving portion; wherein, the operation control method, in a case where a temperature of the movement space is lower than a predetermined first temperature outside the execution period of the output process for outputting the sheet after image formation using the image forming apparatus and the post processing apparatus, causes the stapling portion to move back-and-forth and causes the airflow generating portion to generate the airflow until the temperature of the movement space exceeds a second temperature that is higher than the first temperature.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the accompanying drawings. Note that the following embodiments are examples that embody a technique according to the present disclosure, and do not limit the technical scope of the present disclosure.

Configuration of Image Forming System 100

Figure 1:
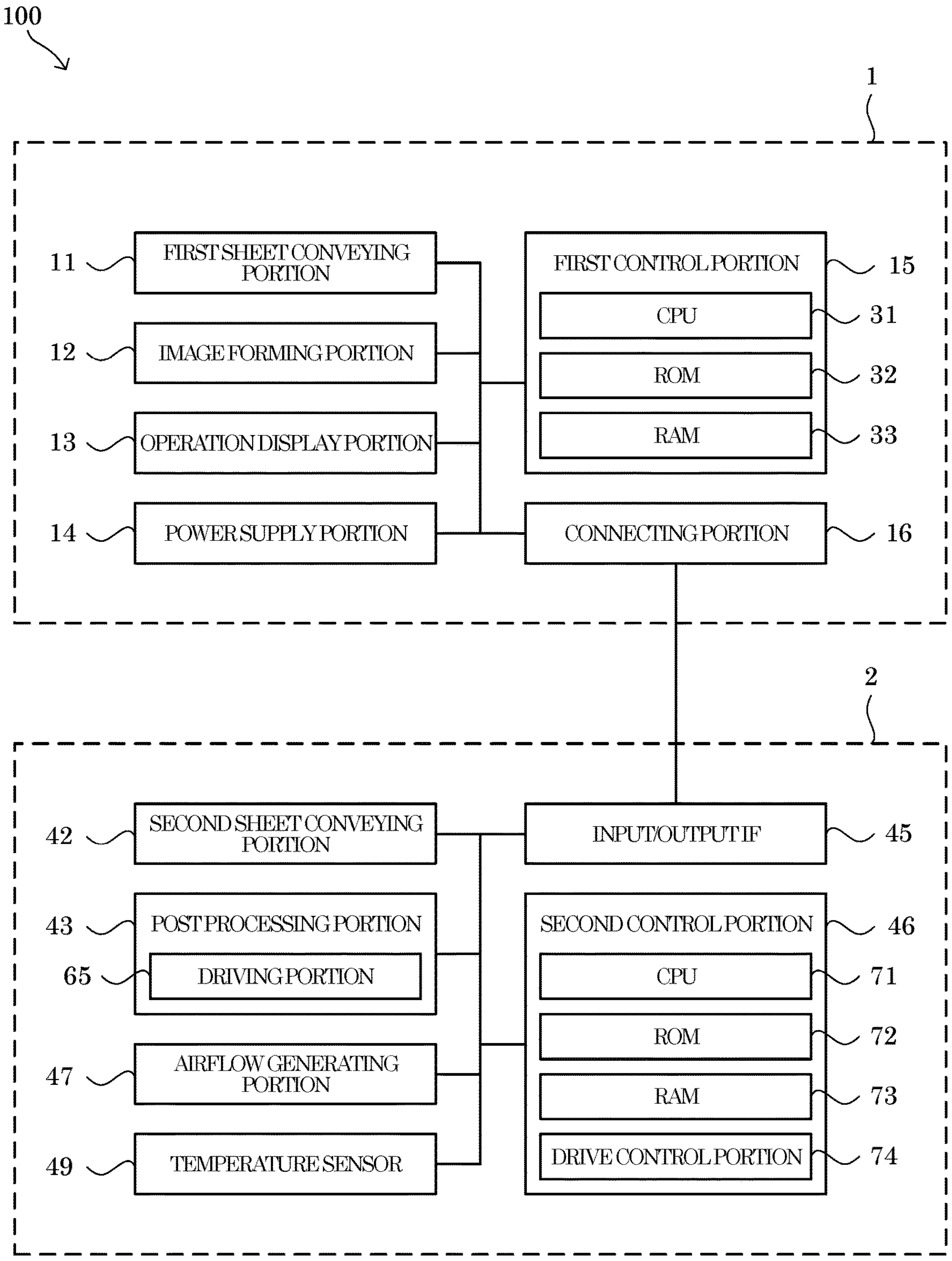
FIG. 1 is a diagram showing a configuration of an image forming system of an embodiment according to the present disclosure.

First, a configuration of an image forming system 100 of an embodiment according to the present disclosure will be described with reference to FIG. 1. Here, FIG. 1 is a block diagram showing the configuration of the image forming system 100. Note that in FIG. 1, an image forming apparatus 1 and a post processing apparatus 2 are indicated by broken lines.

As shown in FIG. 1, the image forming system 100 includes the image forming apparatus 1 and the post processing apparatus 2.

The image forming apparatus 1 is a printer that has a printing function that forms an image on a sheet based on image data. More specifically, the image forming apparatus 1 forms an ink image on a sheet according to an inkjet method. Note that the image forming apparatus 1 may be a facsimile machine, a copy machine, or a multifunction peripheral having the printing function. In addition, the image forming apparatus 1 may form an image on a sheet according to an image forming method different from the inkjet method.

The post processing apparatus 2 executes predetermined post processing on a sheet on which an image has been formed and that is conveyed from the image forming apparatus 1. More specifically, the post processing includes a stapling process of binding a bundle of sheets using staples. Note that the post processing may include a process different from the stapling process, such as a punching process for punching holes in the sheet.

Configuration of the Image Forming Apparatus 1

Figure 2:
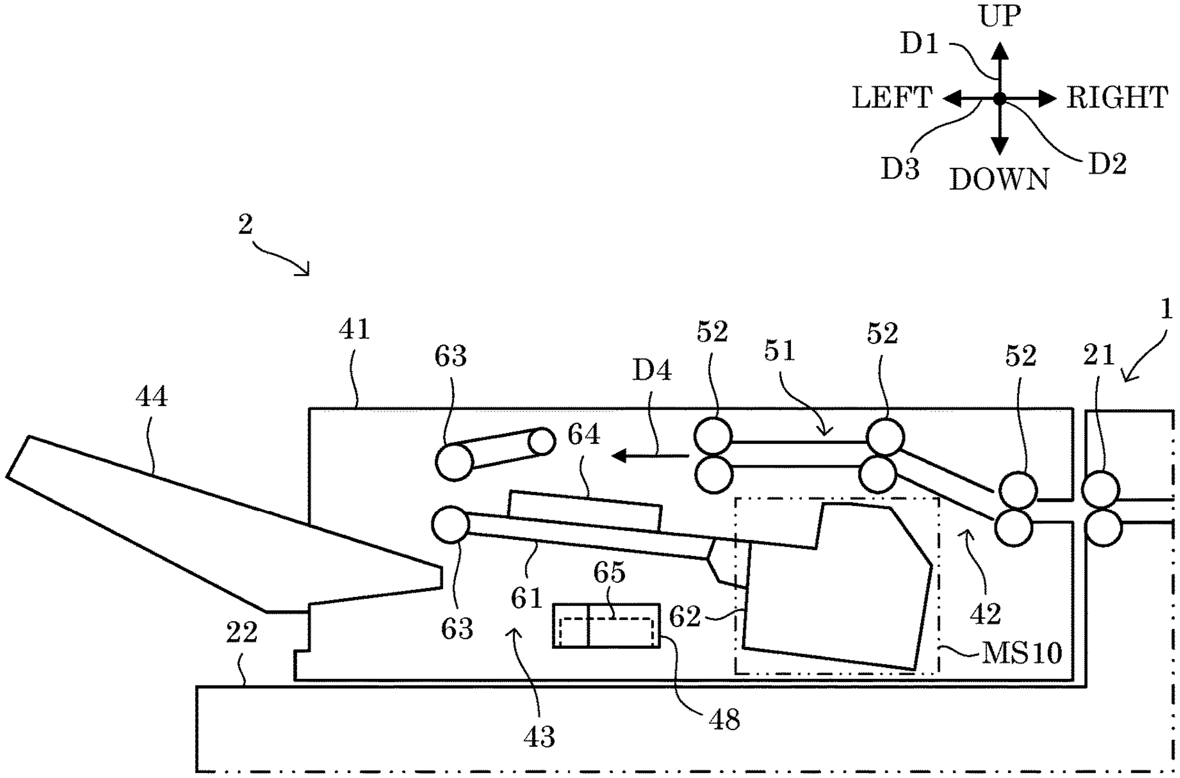
FIG. 2 is a diagram showing a configuration of a post processing apparatus of an embodiment according to the present disclosure.

Next, a configuration of the image forming apparatus 1 will be described with reference to FIGS. 1 and 2. Here, FIG. 2 is a cross-sectional view showing a configuration of the post processing apparatus 2 mounted on a first sheet discharge tray 22. Note that in FIG. 2, a movement space MS10 of a stapling portion 62 is shown by a double-dot chain line.

Note that for convenience of explanation, a vertical direction of the paper surface in FIG. 2 is defined as a vertical direction D1 of the image forming apparatus 1. In addition, a front-rear direction D2 is defined with a front side of the paper of the image forming apparatus 1 shown in FIG. 2 as the front surface (front surface) of the image forming apparatus 1. Moreover, a left-right direction D3 is defined with the front surface of the image forming apparatus 1 as a reference.

As shown in FIG. 1, the image forming apparatus 1 includes a first sheet conveying portion 11, an image forming portion 12, an operation display portion 13, a power supply portion 14, a first control portion 15, and a connecting portion 16.

The first sheet conveying portion 11 conveys a sheet on which an image is formed by the image forming portion 12. More specifically, the first sheet conveying portion 11 includes a sheet feed cassette, a sheet conveying path, and a plurality of conveying roller pairs.

Furthermore, the first sheet conveying portion 11 includes a first sheet discharge roller pair 21 (see FIG. 2) and a first sheet discharge tray 22 (see FIG. 2). In a case where the post processing apparatus 2 is not installed on the first paper output tray 22, the first sheet discharge roller pair 21 discharges the sheet on which an image has been formed by the image forming portion 12 to the first sheet discharge tray 22. The first sheet discharge tray 22 is provided at an upper portion of a housing of the image forming apparatus 1. The first sheet discharge tray 22 is used in the image forming apparatus 1 to stack sheets after image formation. More specifically, in a case where the post processing apparatus 2 is not installed, the first sheet discharge tray 22 receives sheets discharged by the first sheet discharge roller pair 21. The first sheet discharge tray 22 is an example of a second sheet stacking portion according to the present disclosure.

The image forming portion 12 achieves the printing function. More specifically, the image forming portion 12 forms a color or monochrome image on the sheet conveyed by the first sheet conveying portion 11 according to an inkjet method. The image forming portion 12 includes four line heads corresponding to four printing colors: C (cyan), M (magenta), Y (yellow), and B (black). Each of the line heads discharges ink of a printing color corresponding to the line head toward the sheet.

The operation display portion 13 is a user interface of the image forming apparatus 1. The operation display portion 13 includes a display portion and an operation portion. The display portion displays various types of information according to control instructions from the first control portion 15. For example, the display portion is a liquid crystal display. The operation portion inputs various types of information to the first control portion 15 according to a user operation. For example, the operation portion is a touch panel.

The power supply portion 14 supplies power to each portion of the image forming apparatus 1. In addition, the power supply portion 14 supplies power to each portion of the post processing apparatus 2 installed in the image forming apparatus 1. More specifically, the power supply portion 14 includes an AC/DC converter or a DC/DC converter that can output a direct-current (DC) voltage of a predetermined voltage value.

The first control portion 15 performs overall control of the image forming system 100. That is, the first control portion 15 controls the image forming apparatus 1 and the post processing apparatus 2. Note that the first control portion 15 may be a control portion provided separately from a main control portion that performs overall control of the image forming system 100.

As shown in FIG. 1, the first control portion 15 includes a CPU 31, a ROM 32, and a RAM 33. The CPU 31 is a processor that executes various types of calculation processes. The ROM 32 is a nonvolatile storage device in which information such as control programs for causing the CPU 31 to execute various types of processes is stored in advance. The RAM 33 is a volatile or non-volatile storage device used as a temporary storage memory (work area) for various types of processes executed by the CPU 31. The CPU 31 performs overall control of the image forming system 100 by executing various types of control programs stored in the ROM 32 in advance. Note that the first control portion 15 may be configured with an electronic circuit such as an integrated circuit (ASIC).

The first control portion 15 switches the operation mode of the image forming system 100 between a normal mode and a power saving mode.

Here, the power saving mode is an operation mode of the image forming system 100 that consumes less power than the normal mode. More specifically, in the power saving mode, power supply to part of the components of the image forming system 100 is stopped. The post processing apparatus 2 is included as a target for which the power supply is to be stopped in the power saving mode. That is, power supply to the post processing apparatus 2 is stopped in a case where the operation mode of the image forming system 100 is switched from the normal mode to the power saving mode.

More specifically, in a case where the operation mode of the image forming system 100 is the normal mode, the first control portion 15 switches the operation mode from the normal mode to the power saving mode when a predetermined transition condition is satisfied.

For example, the transition conditions include a first transition condition and a second transition condition. The first control portion 15 switches the operation mode of the image forming system 100 to the power saving mode when either the first transition condition or the second transition condition is satisfied. The first transition condition is that a no-operation state in which no operation input is performed to the image forming system 100 continues for a predetermined period of time. The second transition condition is that an operation is performed on the operation display portion 13 to input an instruction to transition to the power saving mode. Note that the transition conditions may include conditions different from those described above.

In addition, in a case where the operation mode of the image forming system 100 is the power saving mode, the first control portion 15 switches the operation mode from the power saving mode to the normal mode when a predetermined return condition is satisfied.

For example, the return condition includes a first return condition and a second return condition. In a case where either the first return condition or the second return condition is satisfied, the first control portion 15 switches the operation mode of the image forming system 100 to the normal mode. The first return condition is to receive an instruction to execute an output process transmitted from an external information processing apparatus. The output process is a process to output a sheet after image formation using the image forming apparatus 1 and the post processing apparatus 2. In other words, the output process is a process of forming an image on a sheet using the image forming apparatus 1, binding a bundle of sheets after image formation using the post processing apparatus 2, and outputting the bound bundle of sheets after image formation to a second sheet discharge tray 44 of the post processing apparatus 2. The second return condition is that the operation display portion 13 is operated. Note that the return condition may include conditions different from those described above. In addition, the output process may be a process of forming an image on a sheet using the image forming apparatus 1 and outputting the sheet after the image formation to a sheet processing tray 61 of the post processing apparatus 2.

In a case of switching the operation mode of the image forming system 100 from the normal mode to the power saving mode, the first control portion 15 inputs a control signal to the power supply portion 14 to stop power supply to part of the components of the image forming system 100. In addition, in a case of switching the operation mode of the image forming system 100 from the power saving mode to the normal mode, the first control portion 15 inputs a control signal to the power supply portion 14 to restart the power supply to part of the components of the image forming system 100.

The connecting portion 16 is a connector that electrically connects the image forming apparatus 1 and the post processing apparatus 2. The power supply portion 14, via the connecting portion 16, supplies power to each portion of the post processing apparatus 2 that is connected to the connecting portion 16. The first control portion 15, via the connecting portion 16, controls the post processing apparatus 2 connected to the connecting portion 16.

Configuration of the Post Processing Apparatus 2

Figure 3:
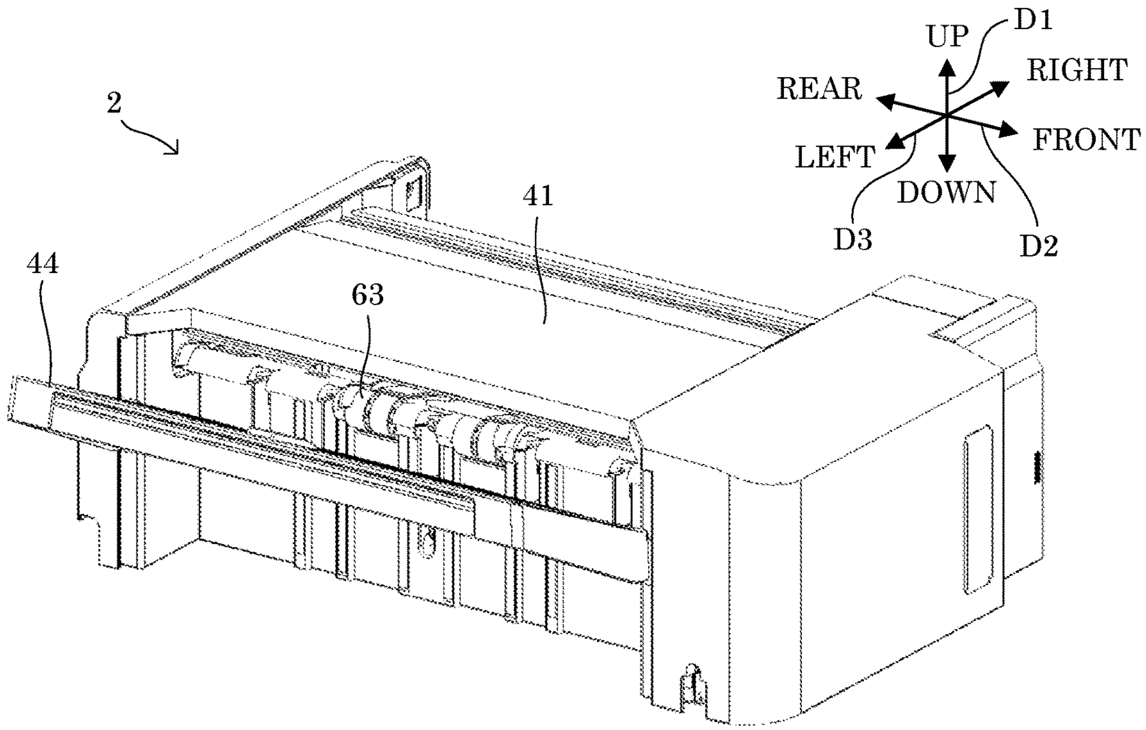
FIG. 3 is a diagram showing a configuration of a post processing apparatus of an embodiment according to the present disclosure.
Figure 4:
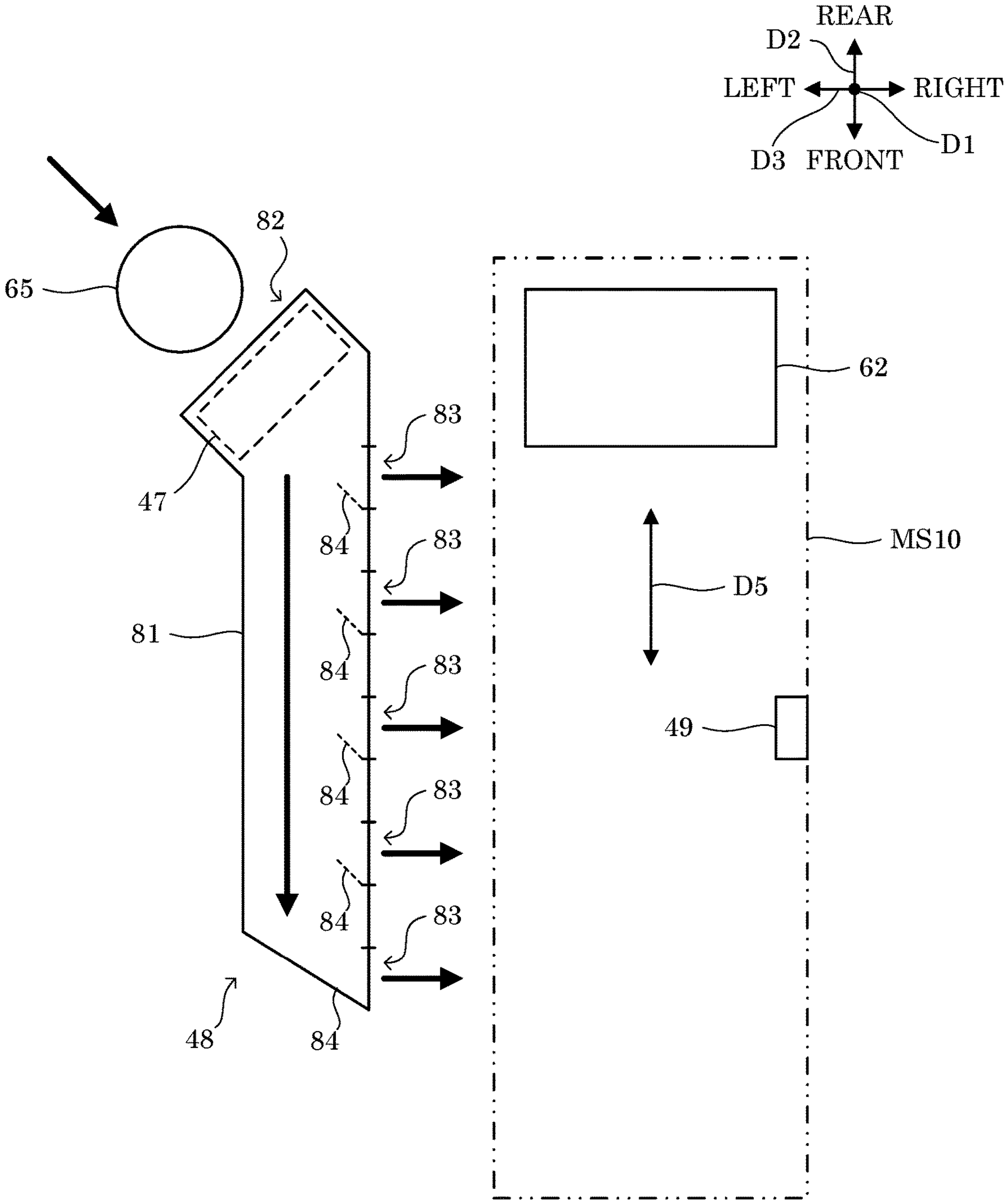
FIG. 4 is a diagram showing a configuration of a duct of the post processing apparatus of an embodiment according to the present disclosure.

Next, a configuration of the post processing apparatus 2 will be described with reference to FIG. 1 to FIG. 4. Here, FIG. 3 is a perspective view showing an external configuration of the post processing apparatus 2. In addition, FIG. 4 is a plan view showing the configuration of a lower side of the sheet processing tray 61. Note that in FIG. 4, a movement space MS10 of a staple portion 62 is shown by a double-dot chain line. In addition, in FIG. 4, the airflow generated by an airflow generating portion 47 is indicated by a thick line with an arrow.

The post processing apparatus 2 is attached to the first sheet discharge tray 22 of the image forming apparatus 1 (see FIG. 2). The post processing apparatus 2 is a type of post processing apparatus called an inner type. Note that the post processing apparatus 2 may be a type of post processing apparatus called a floor type or a saddle type, which is provided adjacent to the image forming apparatus 1 on an installation surface where the image forming apparatus 1 is installed.

As shown in FIG. 1, FIG. 2, and FIG. 4, the post processing apparatus 2 includes a housing 41, a second sheet conveying portion 42, a post processing portion 43, a second sheet discharge tray 44, an input/output IF 45, a second control portion 46, an airflow generating portion 47, a duct 48, and a temperature sensor 49.

The housing 41 houses the components of the post processing apparatus 2. As shown in FIG. 2, the housing 41 is placed on an upper surface of the first sheet discharge tray 22 of the image forming apparatus 1. As shown in FIG. 3, the housing 41 is formed into a substantially rectangular shape.

The second sheet conveying portion 42 conveys the sheet conveyed from the image forming apparatus 1 to the post processing portion 43. As shown in FIG. 2, the second sheet conveying portion 42 includes a sheet conveying path 51 and a plurality of conveying roller pairs 52. The sheet conveying path 51 guides the sheet discharged from the first sheet discharge roller pair 21 to the sheet processing tray 61 of the post processing portion 43. The sheet conveying path 51 extends from the first sheet discharge roller pair 21 to the post processing portion 43 along a discharge direction in which the sheet is discharged by the first sheet discharge roller pair 21. The plurality of conveying roller pairs 52 are provided in the sheet conveying path 51 and convey the sheet in the conveying direction D4 shown in FIG. 2.

The post processing portion 43 performs the stapling process on a plurality of sheets conveyed from the image forming apparatus 1. As shown in FIG. 2, the post processing portion 43 includes the sheet processing tray 61, a stapling portion 62, a second sheet discharge roller pair 63, a pair of alignment members 64, and a driving portion 65.

Sheets after image formation that are conveyed from the image forming apparatus 1 are stacked on the sheet processing tray 61. More specifically, sheets that are conveyed by the second sheet conveying portion 42 are stacked on the sheet processing tray 61. The sheet processing tray 61 is an example of a first sheet stacking portion according to the present disclosure.

The stapling portion 62 is provided below the sheet conveying path 51 leading to the sheet processing tray 61 so as to be movable along a sheet width direction D5 (see FIG. 4) orthogonal to the sheet conveying direction D4 (see FIG. 2), and executes the stapling process of binding the bundle of sheets stacked on the sheet processing tray 61. The stapling portion 62 is formed into a substantially rectangular shape. As shown in FIG. 2, the stapling portion 62 is provided at an end on an upstream side in the conveying direction D4 of the sheet processing tray 61.

The second sheet discharge roller pair 63 discharges the bundle of sheets bound by the stapling portion 62 to the second sheet discharge tray 44.

A pair of alignment members 64 align the bundle of sheets stacked on the sheet processing tray 61. More specifically, the pair of alignment members 64 are provided in the sheet processing tray 61 so as to be movable along the front-rear direction D2 in a direction to come into contact with each other and in a direction to separate from each other. The pair of alignment members 64 come into contact with both ends in the front-rear direction D2 of the bundle of sheets stacked on the sheet processing tray 61 to align the bundle of sheets.

The driving portion 65 generates a driving force that moves the stapling portion 62 according to the power supply.

For example, the driving portion 65 is a stepping motor. A predetermined drive current is supplied to the driving portion 65 in a case of being rotationally driven during execution of the output process. The stapling portion 62 moves by receiving the driving force supplied from the driving portion 65 via a power transmission mechanism (not shown). The drive current is predetermined so that the stapling portion 62 can be moved. In addition, a predetermined holding current is supplied to the driving portion 65 when the driving portion 65 is stopped during execution of the output process. The holding current is a current smaller than the drive current. As shown in FIG. 2, the driving portion 65 is provided below the sheet processing tray 61.

The input/output IF 45 is an interface that processes electrical signals input from the image forming apparatus 1 and electrical signals output to the image forming apparatus 1. In addition, the input/output IF 45 is supplied with power used to drive each part of the post processing apparatus 2 from the power supply portion 14 of the image forming apparatus 1 via the connecting portion 16.

The second control portion 46 controls the post processing apparatus 2. As shown in FIG. 1, the second control portion 46 includes a CPU 71, a ROM 72, and a RAM 73. The functions of the CPU 71, ROM 72, and RAM 73 are the same as those of the CPU 31, ROM 32, and RAM 33. Note that the second control portion 46 may be configured with an electronic circuit such as an integrated circuit (ASIC).

In an inkjet image forming apparatus, defects such as curls being formed on a sheet may occur due to moisture included in the sheet after image formation. On the other hand, a heat treatment apparatus is known that heats a sheet after image formation.

Here, in the post processing apparatus installed in the image forming apparatus as well, defects such as curling of the sheet may occur due to moisture contained in the sheet after image formation. However, conventionally, in the post processing apparatus, there has been no configuration capable of suppressing the occurrence of defects caused by moisture contained in a sheet after image formation.

In contrast, in the image forming system 100 of an embodiment according to the present disclosure, as will be described below, it is possible to suppress occurrence of defects caused by moisture contained in the sheet after image formation.

The airflow generating portion 47 generates an airflow that flows into the movement space MS10 of the stapling portion 62 via the driving portion 65.

More specifically, the airflow generating portion 47 is provided inside the duct 48.

For example, the airflow generating portion 47 is an axial flow fan that generates the airflow according to the power supply. Note that the airflow generating portion 47 is not limited to an axial flow fan, and may be a sirocco fan or the like.

The duct 48 guides the airflow that has passed through the driving portion 65 to the movement space MS10.

As shown in FIG. 2, the duct 48 is provided below the sheet processing tray 61 of the post processing portion 43.

As shown in FIG. 4, the duct 48 includes an extending portion 81, an air intake port 82, a plurality of air outlets 83, and a plurality of guide portions 84.

The extending portion 81 extends along a width direction D5 (see FIG. 4) farther on the downstream side than the movement space MS10 in the conveying direction D4 (see FIG. 2).

As shown in FIG. 4, the extending portion 81 is provided so as to face the movement space MS10 in the direction along the conveying direction D4 (left-right direction D3). For example, the extending portion 81 is formed on a hollow square prism.

The air intake port 82 is provided at an end portion in the width direction D5 of the extending portion 81.

As shown in FIG. 4, the air intake port 82 is provided at a rear end portion in the extending portion 81. The air intake port 82 opens toward the left rear side of the image forming apparatus 1.

As shown in FIG. 4, the airflow generating portion 47 is provided inside the air intake port 82. In addition, as shown in FIG. 4, the driving portion 65 is provided facing the air intake port 82.

The plurality of air outlets 83 are provided in line along the width direction D5 in the extending portion 81, and each opens toward the movement space MS10.

As shown in FIG. 4, the duct 48 includes five air outlets 83. The five air outlets 83 are arranged in the extending portion 81 at equal intervals along the width direction D5. Note that the number of air outlets 83 provided in the duct 48 does not need to be limited to five.

The guide portions 84 are provided corresponding to each of the air outlets 83 and guide the airflow flowing along the extending portion 81 to the air outlets 83.

As shown in FIG. 4, each of the guide portions 84 is formed in a plate shape that extends from an edge portion on a downstream side in the direction of travel of the airflow within the extending portion 81 of the air outlet 83 toward inside of the duct 48 along a direction crossing the direction of travel. Note that as shown in FIG. 4, the end of the extending portion 81 on the downstream side in the direction of travel of the airflow also serves as a guide portion 84 among the plurality of guide portions 84 that is located at the most downstream position in the direction of travel of the airflow.

When the airflow generating portion 47 is driven, air around the driving portion 65 provided opposite to the air intake port 82 of the duct 48 is sucked into the duct 48. The air sucked into the duct 48 moves along the extending portion 81, is guided by the plurality of guide portions 84, and is blown out from the plurality of air outlets 83.

Here, the airflow generating portion 47 is provided inside the duct 48. Thus, compared to a configuration in which the airflow generating portion 47 is provided outside the duct 48, it is possible to efficiently send the airflow generated by the airflow generating portion 47 to the movement space MS10. In addition, compared to a configuration that does not include the duct 48, it is not necessary to provide the driving portion 65 at a position facing the movement space MS10, and thus it is possible to increase the degree of freedom in the arrangement of the driving portion 65.

Moreover, the duct 48 includes the extending portion 81 and the plurality of air outlets 83. Thus, compared to a configuration in which there is only one air outlet 83, it is possible to suppress the temperature of the movement space MS10 heated by the airflow from becoming non-uniform in the width direction D5.

Furthermore, the driving portion 65 is provided opposite to the air intake port 82 provided at an end of the extending portion 81 in the width direction D5. Thus, the shape of the duct 48 can be made into a simple shape extending along the width direction D5, and the flow path resistance inside the duct 48 can be reduced.

Note that the duct 48 is not limited to the shape described above, and may have any shape. In addition, the post processing apparatus 2 does not need to include the duct 48.

The temperature sensor 49 detects the temperature of the movement space MS10. As shown in FIG. 4, the temperature sensor 49 is provided in the movement space MS10. The temperature sensor 49 inputs an electrical signal corresponding to the temperature of movement space MS10 to the second control portion 46.

Configuration of the Second Control Portion 46

Next, a configuration of the second control portion 46 will be described with reference to FIG. 1.

As shown in FIG. 1, the second control portion 46 includes a drive control portion 74. The post processing apparatus 2 including the drive control portion 74 is an example of the sheet processing system according to the present disclosure.

More specifically, the ROM 72 of the second control portion 46 stores in advance an operation control program for causing the CPU 71 to function as the drive control portion 74. The CPU 71 functions as the drive control portion 74 by executing the operation control program stored in the ROM 72. Note that the drive control portion 74 may be configured with an electronic circuit.

In a case where the temperature of the movement space MS10 is lower than a predetermined first temperature outside the execution period of the output process in which a sheet after image formation is output using the image forming apparatus 1 and the post processing apparatus 2, the drive control portion 74 executes a drive control process that causes the stapling portion 62 to move back-and-forth and causes the airflow generating portion 47 to generate the airflow until the temperature of the movement space MS10 exceeds a second temperature that is higher than or equal to the first temperature.

In addition, in a case where an instruction to execute the output process is input before the temperature of the movement space MS10 exceeds the second temperature, the drive control portion 74 stops the back-and-forth movement of the stapling portion 62.

For example, the first temperature is 40 degrees. Moreover, the second temperature is 50 degrees. Note that the first temperature and the second temperature may be arbitrarily changeable according to a predetermined operation on the operation display portion 13 of the image forming apparatus 1.

For example, the drive control portion 74 supplies a predetermined specific current to the driving portion 65 and controls the rotational drive of the driving portion 65 to cause the stapling portion 62 to move back-and-forth along the width direction D5. Further, the drive control portion 74 supplies power to the airflow generating portion 47 to cause the airflow generating portion 47 to generate the airflow. For example, the specific current is a current that is the same as the drive current or larger than the drive current. The larger the specific current is, the greater the amount of heat generated by the driving portion 65 that receives the supply of specific current. For example, the drive control portion 74 supplies the specific current to the driving portion 65 by controlling the output of a constant current power supply (not shown) that supplies power to the driving portion 65.

Note that, in a case where the temperature of the movement space MS10 is lower than the first temperature outside the execution period of the output process, the drive control portion 74 may supply power to the driving portion 65 in a state in which the stapling portion 62 is stopped and cause the airflow generating portion 47 to generate the airflow until the temperature of the movement space MS10 exceeds the second temperature.

Operation Control Process

Figure 5:
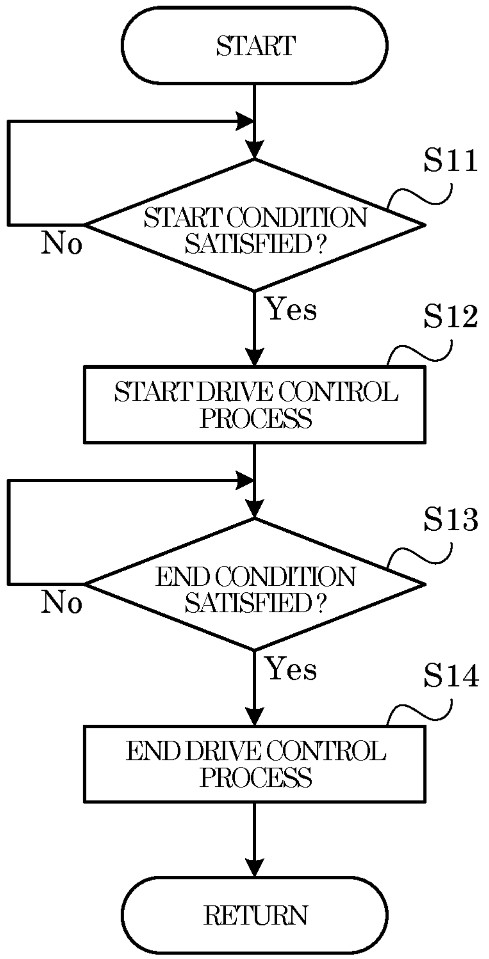
FIG. 5 is a flowchart showing an example of an operation control process executed by the image forming system of an embodiment according to the present disclosure.

Hereinafter, the operation control method according to the present disclosure, together with an example of the procedure of the operation control process executed by the second control portion 46 in the post processing apparatus 2 will be described with reference to FIG. 5. Here, steps S11, S12, and so on represent the numbers of processing procedures (steps) executed by the second control portion 46.

Step S11

First, in step S11, the second control portion 46 determines whether or not the start conditions for the drive control process are satisfied.

More specifically, in a case where the temperature of the movement space MS10 is lower than the first temperature outside the execution period of the output process, the second control portion 46 determines that the start condition for the drive control process is satisfied.

Here, when the second control portion 46 determines that the start condition for the drive control process is satisfied (Yes in S11), the second control portion 46 moves the process to step S12. In addition, when the start condition for the drive control process is not satisfied (No in S11), the second control portion 46 waits for the start condition for the drive control process to be satisfied in step S11.

Step S12

In step S12, the second control portion 46 starts the drive control process that causes the stapling portion 62 to move back-and-forth and causes the airflow generating portion 47 to generate the airflow.

More specifically, the second control portion 46 supplies the specific current to the driving portion 65 and controls the rotational drive of the driving portion 65 to cause the stapling portion 62 to move back-and-forth along the width direction D5. In addition, the second control portion 46 supplies power to the airflow generating portion 47 to cause the airflow generating portion 47 to generate the airflow.

Step S13

In step S13, the second control portion 46 determines whether or not the conditions for ending the drive control process are satisfied.

More specifically, in a case where the temperature of the movement space MS10 exceeds the second temperature, the second control portion 46 determines that the condition for ending the drive control process is satisfied. Moreover, in a case where an instruction to execute the output process is input, the second control portion 46 determines that the condition for ending the drive control process is satisfied.

Here, when the second control portion 46 determines that the end condition for the drive control process is satisfied (Yes in S13), the second control portion 46 moves the process to step S14. In addition, when the end condition for the drive control process is not satisfied (No in S13), the second control portion 46 waits for the end condition for the drive control process to be satisfied in step S13.

Step S14

In step S14, the second control portion 46 ends the drive control process. The processes from step S11 to step S14 are executed by the drive control portion 74 of the second control portion 46.

More specifically, the second control portion 46 stops the back-and-forth movement of the stapling portion 62. Note that in a case of terminating the drive control process, the second control portion 46 may stop or continue driving the airflow generating portion 47. In addition, in a case of terminating the drive control process, the second control portion 46 may stop or continue supplying power to the driving portion 65. For example, the second control portion 46 may supply the holding current to the driving portion 65 while the stapling portion 62 is stopped after the drive control process is completed.

In this way, the image forming system 100 includes the airflow generating portion 47 that generates the airflow that flows into the movement space MS10 of the stapling portion 62 via the driving portion 65. Thus, the air around the driving portion 65 that has been warmed by the drive of the driving portion 65 can be sent to the movement space MS10, and it is possible to warm the movement space MS10 and the sheet conveying path 51 located above movement space MS10. Therefore, it is possible to promote drying of the sheet conveyed along the sheet conveying path 51. Therefore, it is possible to suppress the occurrence of defects caused by moisture contained in the sheet after image formation.

In addition, in the image forming system 100, in a case where the temperature of the movement space MS10 is lower than the first temperature outside the execution period of the output process, the drive control process is executed until the temperature of the movement space MS10 exceeds the second temperature. Thus, it is possible to warm up the sheet conveying path 51 before executing the output process.

In addition, in the image forming system 100, in a case where an instruction to execute the output process is input before the temperature of the movement space MS10 exceeds the second temperature, the back-and-forth movement of the stapling portion 62 is stopped. The stapling portion 62 is used for the output process, and thus the output process cannot be executed while the stapling portion 62 is being moved back-and-forth. That is, compared to a configuration in which the back-and-forth movement of the stapling portion 62 is not stopped when an instruction to execute the output process is input, it is possible to avoid a delay in executing the output process.

Note that the drive control portion 74 may be included in the first control portion 15 of the image forming apparatus 1. The image forming system 100 including the drive control portion 74 is another example of the sheet processing system according to the present disclosure.

Note that the driving portion according to the present disclosure is not limited to a stepping motor, and may be a motor of a different type than a stepping motor.

Supplementary Notes

Hereinafter, a summary of the disclosure extracted from the above-described embodiments will be added. Note that each configuration and each processing function described in the following supplementary notes can be selected and combined as desired.

Supplementary Note 1

A post processing apparatus, including:
- a first sheet stacking portion on which a sheet conveyed from an image forming apparatus that forms an image on the sheet is stacked;
- a stapling portion provided below a sheet conveying path leading to the first sheet stacking portion so as to be able to move along a width direction of the sheet orthogonal to a sheet conveying direction, and configured to bundle sheets stacked on the first sheet stacking portion;
- a driving portion configured to generate a driving force to move the stapling portion according to a power supply; and
- an airflow generating portion configured to generate an airflow that flows into a movement space of the stapling portion via the driving portion.

Supplementary Note 2

The post processing apparatus according to supplementary note 1, further including
- a duct configured to guide the airflow that has passed through the driving portion to the movement space; wherein
- the airflow generating portion is provided inside the duct.

Supplementary Note 3

The post processing apparatus according to supplementary note 2, wherein the duct includes:
- an extending portion configured to extend along the width direction farther on a downstream side in the conveying direction than the movement space;
- a plurality of air outlets arranged in line along the width direction in the extending portion and each configured to open toward the movement space; and
- guide portions that are provided corresponding to each of the air outlets and configured to guide the airflow flowing along the extending portion toward the air outlets.

Supplementary Note 4

The post processing apparatus according to supplementary note 3, wherein
- the duct includes an air intake port provided at an end in the width direction of the extending portion, and the driving portion is provided facing the air intake port.

Supplementary Note 5

The post processing apparatus according to any one of supplementary notes 1 to 4, wherein
- the post-processing apparatus
- is mounted to a second sheet stacking section provided in the image forming apparatus and used for stacking the sheets after image formation.

Supplementary Note 6

A sheet processing system, comprising:
- the post processing apparatus according to any one of supplementary notes 1 to 5; and
- a drive control portion that, in a case where a temperature of the movement space is lower than a predetermined first temperature outside the execution period of the output process for outputting the sheet after image formation using the image forming apparatus and the post processing apparatus, is configured to cause the stapling portion to move back-and-forth and to cause the airflow generating portion to generate the airflow until the temperature of the movement space exceeds a second temperature that is higher than the first temperature.

Supplementary Note 7

The sheet processing system according to supplementary note 6, wherein the drive control portion stops the back-and-forth movement of the stapling portion in a case where an instruction to execute the output process is input before the temperature of the movement space exceeds the second temperature.

Supplementary Note 8

An operation control method executed by a sheet processing system including a post processing apparatus, the post processing apparatus comprising:

a first sheet stacking portion on which a sheet conveyed from an image forming apparatus that forms an image on the sheet is stacked; a stapling portion provided below a sheet conveying path leading to a first sheet stacking portion so as to be able to move along a width direction of the sheet orthogonal to a sheet conveying direction, and configured to bundle sheets stacked on a first sheet stacking portion; a driving portion configured to generate a driving force to move the stapling portion according to a power supply; and an airflow generating portion configured to generate an airflow that flows into a movement space of the stapling portion via the driving portion; wherein the operation control method in a case where a temperature of the movement space is lower than a predetermined first temperature outside the execution period of the output process for outputting the sheet after image formation using the image forming apparatus and the post processing apparatus, causes the stapling portion to move back-and-forth and causes the airflow generating portion to generate the air flow until the temperature of the movement space exceeds a second temperature that is higher than the first temperature.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A post processing apparatus, comprising:

a first sheet stacking portion on which a sheet conveyed from an image forming apparatus that forms an image on the sheet is stacked;

a stapling portion provided below a sheet conveying path leading to the first sheet stacking portion so as to be able to move along a width direction of the sheet orthogonal to a sheet conveying direction, and configured to bundle sheets stacked on the first sheet stacking portion;

a driving portion configured to generate a driving force to move the stapling portion according to a power supply;

an airflow generating portion configured to generate an airflow that flows into a movement space of the stapling portion via the driving portion; and a duct configured to guide the airflow that has passed through the driving portion to the movement space, wherein the airflow generating portion is provided inside the duct.

2. The post processing apparatus according to claim 1, wherein the duct includes:

an extending portion configured to extend along the width direction farther on a downstream side in the conveying direction than the movement space;

a plurality of air outlets arranged in line along the width direction in the extending portion and each configured to open toward the movement space; and guide portions that are provided corresponding to each of the air outlets and configured to guide the airflow flowing along the extending portion toward the air outlets.

3. The post processing apparatus according to claim 2, wherein the duct includes an air intake port provided at an end in the width direction of the extending portion, wherein the driving portion is provided facing the air intake port.

4. The post processing apparatus according to claim 1, wherein the post-processing apparatus is mounted to a second sheet stacking section provided in the image forming apparatus, the second sheet stacking section being used for stacking the sheets after image formation in a case where the post-processing apparatus is not installed.

5. A sheet processing system, comprising:

a post processing apparatus comprising:

a first sheet stacking portion on which a sheet conveyed from an image forming apparatus that forms an image on the sheet is stacked;

a stapling portion provided below a sheet conveying path leading to the first sheet stacking portion so as to be able to move along a width direction of the sheet orthogonal to a sheet conveying direction, and configured to bundle sheets stacked on the first sheet stacking portion;

a driving portion configured to generate a driving force to move the stapling portion according to a power supply; and an airflow generating portion configured to generate an airflow that flows into a movement space of the stapling portion via the driving portion; and a drive control portion that, in a case where a temperature of the movement space is lower than a predetermined first temperature outside the execution period of an output process for outputting the sheet after image formation using the image forming apparatus and the post processing apparatus, is configured to cause the stapling portion to move back-and-forth and to cause the airflow generating portion to generate the airflow until the temperature of the movement space exceeds a second temperature that is higher than the first temperature.

6. The sheet processing system according to claim 5, wherein the drive control portion stops the back-and-forth movement of the stapling portion in a case where an instruction to execute the output process is input before the temperature of the movement space exceeds the second temperature.

7. An operation control method executed by a sheet processing system including a post processing apparatus, the post processing apparatus comprising:

a first sheet stacking portion on which a sheet conveyed from an image forming apparatus that forms an image on the sheet is stacked; a stapling portion provided below a sheet conveying path leading to a first sheet stacking portion so as to be able to move along a width direction of the sheet orthogonal to a sheet conveying direction, and configured to bundle sheets stacked on a first sheet stacking portion; a driving portion configured to generate a driving force to move the stapling portion according to a power supply; and an airflow generating portion configured to generate an airflow that flows into a movement space of the stapling portion via the driving portion; wherein the operation control method in a case where a temperature of the movement space is lower than a predetermined first temperature outside the execution period of the output process for outputting the sheet after image formation using the image forming apparatus and the post processing apparatus, causes the stapling portion to move back-and-forth and causes the airflow generating portion to generate the air flow until the temperature of the movement space exceeds a second temperature that is higher than the first temperature.

* * * * *